(No Model.)
W. CONNELLY.
COUPLING FOR ROD SECTIONS.
No. 584,768. Patented June 22, 1897.
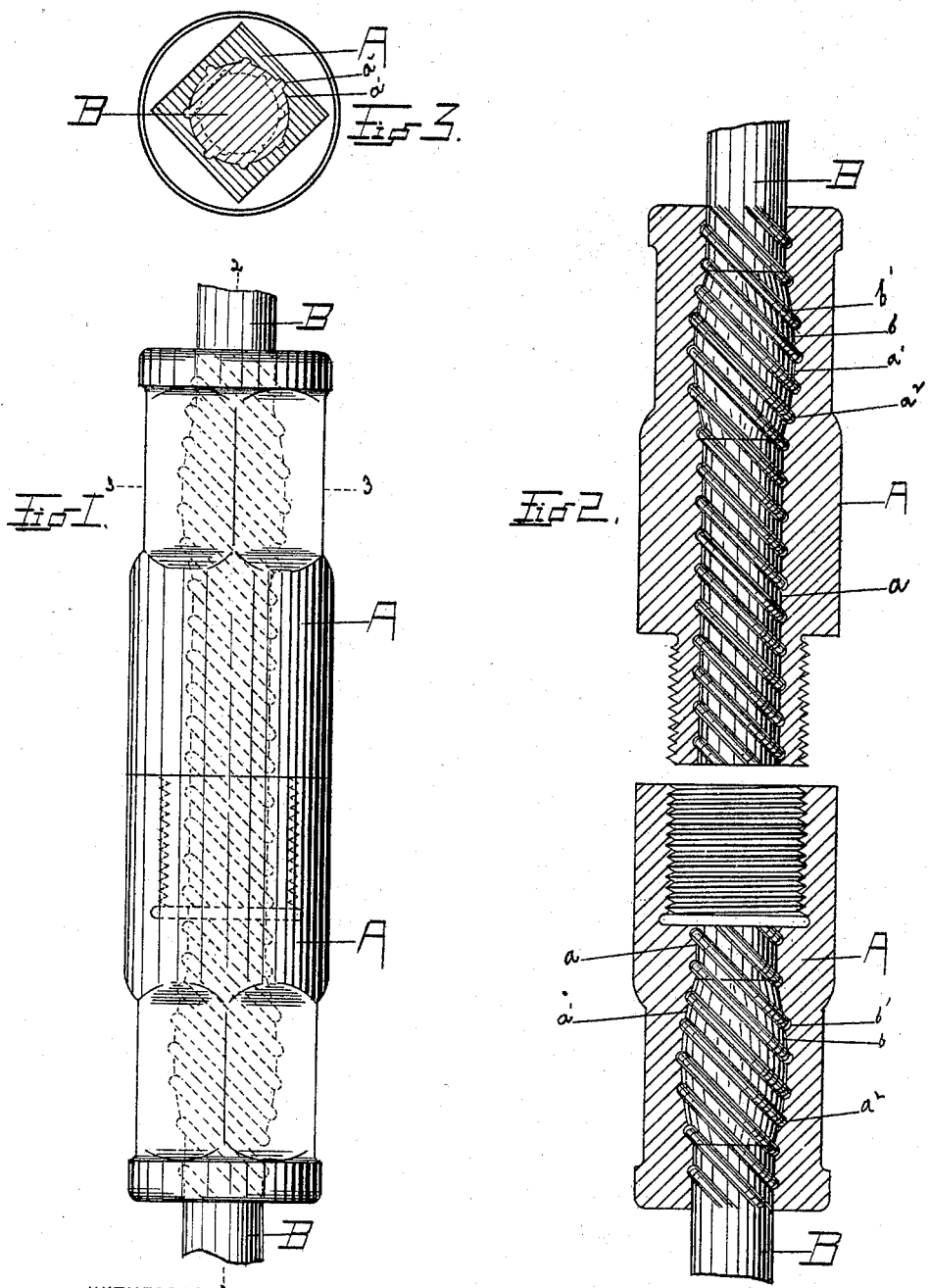
WITNESSES:
Sam Prager
W. G. August
INVENTOR
William Connelly
BY
Hallock Lord
ATTORNEYS

UNITED STATES PATENT OFFICE.

WILLIAM CONNELLY, OF TOLEDO, OHIO.

COUPLING FOR ROD-SECTIONS.

SPECIFICATION forming part of Letters Patent No. 584,768, dated June 22, 1897.

Application filed November 27, 1896. Serial No. 613,571. (No model.)

*To all whom it may concern:*

Be it known that I, WILLIAM CONNELLY, a citizen of the United States, residing at Toledo, in the county of Lucas and State of Ohio, have invented certain new and useful Improvements in Couplings for Rod-Sections; and I do hereby declare the following to be a full, clear, and exact description of the invention, such as will enable others skilled in the art to which it appertains to make and use the same.

The invention relates to unions for rod-couplings and rods; and it consists in certain improvements in the construction thereof, as will be hereinafter fully described, and pointed out in the claims.

The invention is illustrated in the accompanying drawings, as follows:

Figure 1 shows an elevation of the coupling, the union being shown in dotted lines. Fig. 2 shows a section on the line 2 2 in Fig. 1. Fig. 3 shows a section on the line 3 3 in Fig. 1.

The coupling is composed of the parts A A, having the usual male and female screws for connecting them. These parts are provided with the bores $a$ $a$. The rods B B are inserted in these bores, and the union is effected by subjecting the rod, preferably previously heated, to sufficient endwise pressure to upset it into an enlargment $a'$ in the bore $a$.

In order to prevent the twisting of the rod in the sleeve or part A, protuberances or indentures are formed, preferably within the bore, and so located as to be contiguous to the rod when inserted in the bore and into which the rod when upset is forced. In the drawings indentures in the form of spiral grooves are shown within the bore, and these with the enlargement $a'$ securely lock the rod against turning in the coupling.

My invention relates more particularly to the means of preventing the rod from turning in the coupling. I do not therefore wish to be understood as claiming, broadly, the union of the rod and coupling formed by upsetting the rod.

What I claim as new is—

1. In a union for rod-couplings and the rod, the combination of the coupling-sleeve provided with protuberances or indentures arranged to prevent rotative movement of a rod within the bore of said sleeve and in contact with said protuberances or indentures; and a rod in said bore, said rod being inserted and subjected to sufficient endwise pressure to upset the rod and force the metal thereof around said protuberances or into said indentures for the purposes set forth.

2. In a union for rod-couplings and the rod, the combination of the coupling-sleeve having within its bore protuberances or indentures arranged to prevent rotative movement of a rod within the bore of said sleeve and in contact with said protuberances or indentures; and a rod in said bore, said rod being inserted and subjected to sufficient endwise pressure to upset the rod and force the metal thereof around said protuberances or into said indentures for the purposes set forth.

3. In a union for rod-couplings and the rod, the combination of the coupling-sleeve A having the enlargement $a'$ in the bore thereof and provided on the surface of the bore with protuberances or indentures as $a^2$; and a rod B inserted in the bore and subjected to sufficient endwise pressure to force the metal thereof around said protuberances or into said indentures and into the enlargement $a'$ for the purposes set forth.

In testimony whereof I affix my signature in presence of two witnesses.

WILLIAM CONNELLY.

Witnesses:
C. FRANKEY SOUDER,
LOUIS L. D. CHAPMAN.